United States Patent [19]

Ouchi

[11] 4,397,480
[45] Aug. 9, 1983

[54] INSTRUMENT PANEL CONCEALING PLATE STRUCTURE

[75] Inventor: Toshiki Ouchi, Fujisawa, Japan

[73] Assignee: Nissan Motor Co., Ltd., Yokohama, Japan

[21] Appl. No.: 282,682

[22] Filed: Jul. 13, 1981

[30] Foreign Application Priority Data

Jul. 25, 1980 [JP] Japan .................. 55/101315

[51] Int. Cl.³ ............................. B60R 21/02
[52] U.S. Cl. ........................ 280/777; 280/780; 280/752
[58] Field of Search ................. 280/777–780, 280/752; 180/90; 74/492, 493

[56] References Cited

U.S. PATENT DOCUMENTS 2,765,863 10/1956 Barenyi ........................ 180/90
3,498,402 3/1970 Barenyi ........................ 180/90
4,105,223 8/1978 Oda et al. ..................... 280/752

FOREIGN PATENT DOCUMENTS 1429141 1/1966 France .
2210166 7/1974 France .

Primary Examiner—Robert R. Song
Attorney, Agent, or Firm—James Creighton Wray

[57] ABSTRACT

An instrument panel concealing plate is integrally formed with an instrument panel about a steering column for concealing the inside of the instrument panel so as not to be visible through the instrument panel and a steering column cover. According to the invention the concealing plate is formed with a breaking portion consisting of a series of slots or grooves formed in the concealing plate, so that the plate is adapted to be easily broken off when it is subjected to an impact by a steering column cover in collision of a vehicle, thereby absorbing the impact caused by a collision of a bosom of a driver against a steering wheel and preventing sharp edges of broken parts of the steering column cover caused by the breaking off of the cover itself, which would otherwise injure the driver.

3 Claims, 7 Drawing Figures

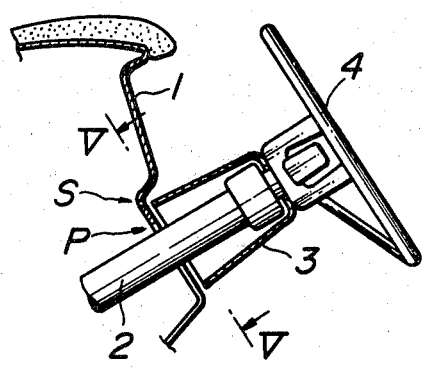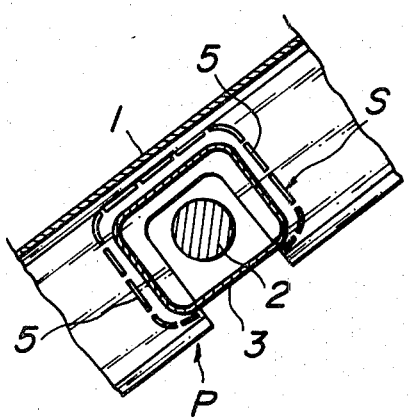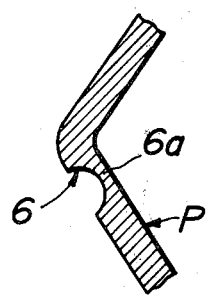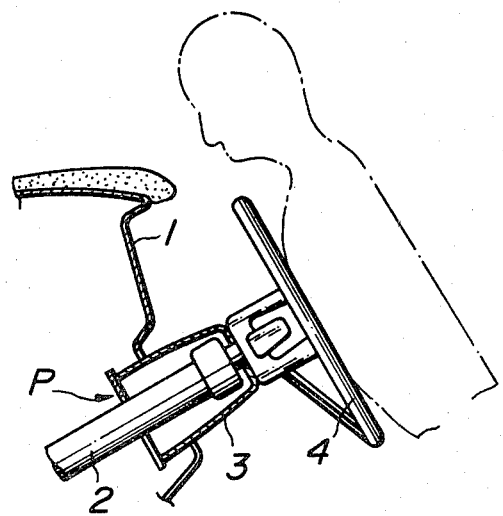

INSTRUMENT PANEL CONCEALING PLATE STRUCTURE

BACKGROUND OF THE INVENTION

1. Field of the Invention

This invention relates to an instrument panel concealing plate structure for concealing an inside of an instrument panel which would otherwise be visible through a clearance between the instrument panel and a steering column cover.

2. Description of the Prior Art

A conventional concealing plate N of this kind, for example, as shown in FIGS. 1 and 2, is arranged integrally with an instrument panel 1 about a steering column 2 for a steering wheel 4 to prevent inner electric wires or other arrangements or light beams from meters in the instrument panel 1 from being visible through a steering column cover 3 and the instrument panel 1.

With this concealing plate N shown, when a bosom of a driver bumps against the steering wheel 4 in an accidental collision, the steering column 2 is forced into a forward direction so that the steering column cover 3 violently strikes the concealing plate N. As a result, a great reaction occurs in the steering wheel 4, so that the bosom of the driver would be subjected to a great impact. It is very dangerous.

Moreover, if the impact acting upon the steering wheel by the bosom of the driver is so great that the load resulting from the impact exceeds the yield strength of the steering column cover 3, the cover is broken to produce sharp edges as shown in FIG. 3, which often tend to wound or injure the driver.

In order to prevent the danger resulting from the breaking of the steering column cover, it has been attempted to use steering column covers made of a rigid material such as ABS resin or the like. In this case, however, such a high strength material is unlikely to be broken while it, on the other hand, gives rise to a greater reaction and is disadvantageous for damping or absorbing the impact in collision. Moreover, the ABS resin itself is expensive to increase the cost as a whole.

SUMMARY OF THE INVENTION

It is an object of the invention to provide an instrument panel concealing plate structure to solve a problem of driver's safety.

It is a further object of the invention to provide an instrument panel concealing plate formed with a breaking portion adapted to be easily broken off when it is subjected to an impact by a steering column cover in collision of a vehicle.

The invention will be more fully understood by referring to the following detailed specification and claims taken in connection with the appended drawings.

BRIEF DESCRIPTION OF THE DRAWINGS

FIG. 4 is a longitudinal sectional view illustrating a construction of a concealing plate according to the invention;

FIG. 5 is an enlarged sectional view taken along the line V—V in FIG. 4;

FIG. 6 is a sectional view illustrating another embodiment of the breaking portion of a concealing plate according to the invention; and FIG. 7 is a longitudinal sectional view illustrating a state when a driver violently collides with the steering wheel shown in FIG. 4.

DETAILED DESCRIPTION OF THE PREFERRED EMBODIMENT

Figure 1:
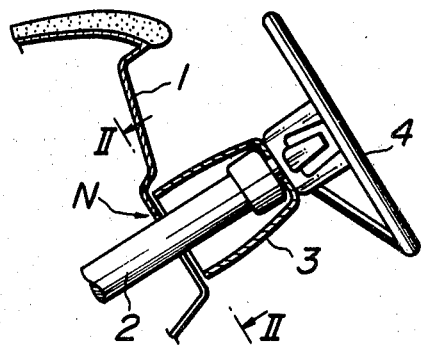
FIG. 1 is a longitudinal sectional view showing a construction of a concealing plate between a steering column cover and an instrument panel of the prior art as mentioned above.
Figure 2:
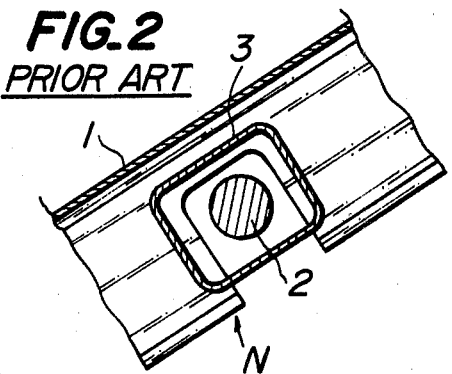
FIG. 2 is an enlarged sectional view taken along the line II—II in FIG. 1.
Figure 3:
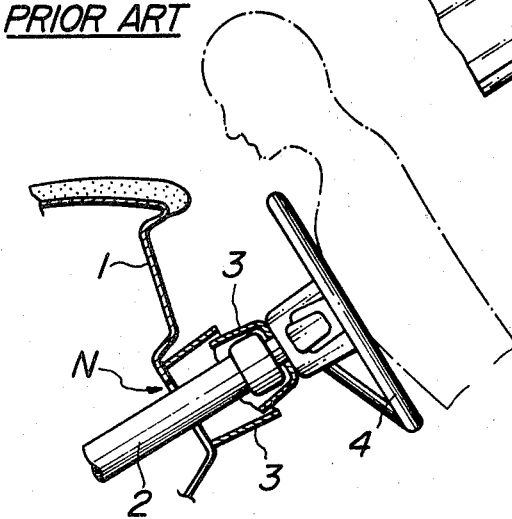
FIG. 3 is a longitudinal sectional view showing a state when a driver violently collides with the steering wheel shown in FIG. 1.

Referring to FIGS. 4 and 5 illustrating one embodiment of the invention, a concealing plate P is arranged integrally with an instrument panel 1 about a steering column 2, thereby concealing the inside of the instrument panel 1 so as not to be visible through a clearance between the instrument panel 1 and a steering column cover 3. According to the invention, the concealing plate P is formed with a breaking portion S along which the concealing plate P is broken off.

The breaking portion S of the concealing plate P consists of a series of slits formed in the concealing plate S and spaced with a desired interval about and outside of the bottom circumference of the steering column cover 3. The interval of the slits is so determined that when the steering column cover 3 collides with the concealing plate P, it is easily broken off, which is depending usually upon strength and thickness of the concealing plate P.

All that is required for the breaking portion S according to the invention is to be easily broken off when the steering column cover 3 collides with the concealing plate P. Instead of the slits 5, therefore, a groove or grooves 6 may be formed to obtain thin portions 6a in the concealing plate P as shown in FIG. 6.

With such an arrangement according to the invention, upon collision of a vehicle a bosom of a driver violently collides with the steering wheel 4, so that the steering column cover 3 fiercely collides with the concealing plate P so as to break it along the breaking portion S as shown in FIG. 7, with the result that the reaction force of the steering wheel 4 is reduced to decrease the impact to which the bosom of the driver is subjected.

As can been seen from the above description, according to the invention a concealing plate is formed with a breaking portion adapted to be easily broken off by collision of the steering column cover upon collision of a vehicle, so that the breaking of the concealing plate absorbs the impact caused by the collision of the bosom of the driver against the steering wheel to reduce the shock to which the driver is subjected, thereby greatly reducing the danger is driving a car.

According to the invention, furthermore, the steering column cover is not broken off, so that sharp edges of broken parts of the steering column cover are not produced in collision which would otherwise injure the driver.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An instrument panel concealing plate integrally formed with an instrument panel about a steering column for concealing an inside of said instrument panel, which would otherwise be visible through the instrument panel and a steering column cover, said concealing plate being formed with a breakaway portion located outwardly of a bottom circumference of said steering column cover, such that said concealing plate is easily broken off along said breakaway portion when the steering column is forced forward to cause the steering column cover to collide with said concealing plate.

2. An instrument panel concealing plate as set forth in claim 1, wherein said breakaway portion consists of a series of slits formed in the concealing plate and spaced with an interval.

3. An instrument panel concealing plate as set forth in claim 1, wherein said breakaway portion consists of at least one groove formed in said concealing plate to form a thin weak portion of the plate.

* * * * *